(12) United States Patent
Mondl

(10) Patent No.: US 8,499,862 B2
(45) Date of Patent: Aug. 6, 2013

(54) SPHERICAL VEHICLE

(76) Inventor: Peter Mondl, Gross Sierning (AT)

( * ) Notice: Subject to any disclaimer, the term of this patent is extended or adjusted under 35 U.S.C. 154(b) by 207 days.

(21) Appl. No.: 12/998,024

(22) PCT Filed: Sep. 4, 2009

(86) PCT No.: PCT/AT2009/000345
§ 371 (c)(1),
(2), (4) Date: Mar. 10, 2011

(87) PCT Pub. No.: WO2010/031093
PCT Pub. Date: Mar. 25, 2010

(65) Prior Publication Data
US 2011/0155481 A1      Jun. 30, 2011

(30) Foreign Application Priority Data
Sep. 17, 2008   (AT) ................. A 1448/2008

(51) Int. Cl.
*B62D 57/00* (2006.01)
(52) U.S. Cl.
USPC ......................................................... 180/7.1
(58) Field of Classification Search
USPC ................. 180/10, 7.1, 65.1; 280/206
See application file for complete search history.

(56) References Cited

U.S. PATENT DOCUMENTS

| | | | |
|---|---|---|---|
| 2,035,192 A | 3/1936 | Richardson | |
| 2,267,254 A | 12/1941 | Reilley | |
| 4,386,787 A | 6/1983 | Maplethorpe et al. | |
| 4,501,569 A | 2/1985 | Clark, Jr. et al. | |
| 4,729,446 A | 3/1988 | Sefton | |
| 5,064,210 A | 11/1991 | Gibbons | |
| 5,439,408 A * | 8/1995 | Wilkinson | 446/409 |
| 5,725,435 A | 3/1998 | De Castro Faria | |
| 6,298,934 B1* | 10/2001 | Shteingold | 180/10 |
| 7,726,422 B2* | 6/2010 | Sun et al. | 180/7.1 |
| 7,963,350 B1* | 6/2011 | Thielman et al. | 180/7.1 |
| 2007/0089633 A1* | 4/2007 | Kovac | 104/53 |
| 2012/0173047 A1* | 7/2012 | Bernstein et al. | 701/2 |

FOREIGN PATENT DOCUMENTS

| | | |
|---|---|---|
| BE | 899 473 | 10/1984 |
| DE | 1 638 606 | 5/1952 |
| DE | 11 62 508 | 2/1964 |
| DE | 10 2004 033 820 | 11/2005 |
| FR | 2 626 548 | 8/1989 |
| GB | 1 292 441 | 10/1972 |
| GB | 2 239 636 | 7/1991 |
| RU | 2 297 356 | 4/2007 |

* cited by examiner

*Primary Examiner* — Tony Winner
(74) *Attorney, Agent, or Firm* — Collard & Roe, P.C.

(57) ABSTRACT

A vehicle has a rotation-symmetrical, particularly spherical housing which is disposed about a rotational axis and has a convex drive and running surface. The housing is composed at least partially of transparent material, and has at least one door for at least one person to enter and exit. In the interior of the housing there is a seat for the at least one person, a drive for rotating the housing, and a device for control purposes. Bearings are provided in the rotational axis of the housing for rotatably mounting a lower seat structure receiving the seat. The drive is disposed on the lower seat structure and connected thereto. In order to improve the handling characteristics of such a vehicle, the seat is disposed displaceably laterally with respect to the lower seat structure.

20 Claims, 3 Drawing Sheets

SPHERICAL VEHICLE

CROSS REFERENCE TO RELATED APPLICATIONS

This application is the National Stage of PCT/AT2009/000345 filed on Sep. 4, 2009, which claims priority under 35 U.S.C. §119 of Austrian Application No. A 1448/2008 filed on Sep. 17, 2008, the disclosure of which is incorporated by reference. The international application under PCT article 21(2) was not published in English.

BACKGROUND OF THE INVENTION

1. Field of the Invention

The present invention relates to a vehicle, comprising a rotation-symmetrical, particularly spherical, housing disposed about a rotational axis and having a convex drive and running surface, wherein the housing is at least partially composed of transparent material, and at least one door for at least one person to enter and exit, and inside the housing a seat for the at least one person, a drive for setting the housing in rotation, and furthermore, a means for steering is provided, wherein bearings are provided in the rotational axis of the housing for rotatably supporting a lower seat structure receiving the seat, and the drive is disposed on the lower seat structure and connected thereto.

Movement of the vehicle both on water and land is caused by rotation of the housing which preferably is symmetrically disposed about the rotational axis. The vehicle according to the present invention is mainly intended for leisure applications, although other applications are not excluded.

2. Prior Art

From DE 1 638 606 U a spherical vehicle made of plexiglass is known having a vehicle access opening, inside which a small, motor-driven chassis is located, the driving force of which is transferred to the ground via one or more gearwheels. This vehicle is able to drive on land and water and is steered by shifting of weight. The spherical housing can consist of one or more parts. In order to optimize stability of the vehicle while driving on land, stabilizer wheels simultaneously functioning as driving wheels can be used.

RU 2 297 356 C2 shows a vehicle comprising a spherical housing, inside which a cabin for the driver is rotatably disposed. The vehicle is driven by a driving wheel at the lower surface of the cabin, the speed of which can be adjusted by the driver. By means of a change in angle of said driving wheel the vehicle can be steered.

In BE 899 473 A a spherical vehicle is described, inside which a seat is disposed movably supported relative to the housing. On the lower surface of the chassis the drive is located. Steering is accomplished by shifting of weight of driver.

GB 2 239 636 A describes a vehicle comprising a hollow spherical body and having a fixed central axis about which it rotates. The cabin is equipped with a mechanism keeping it in upright position, and has drive units setting the cabin in rotation about the own axis thereof.

U.S. Pat. No. 4,729,446 A shows a grid-like spherical structure, the horizontal axis whereof is connected to a motor.

Different vehicles comprising spherical housings and having a movably supported seat inside the sphere are also known from U.S. Pat. Nos. 4,501,569 A, 4,386,787 A, and 2,035,192 A.

U.S. Pat. No. 2,267,254 A describes a vehicle according to the invention, wherein steering is accomplished by lateral displacement of a weight arranged below the seat. In steering the driver is forced into an inclined position, whereby only limited steering is possible. Due to the double-shell structure of the vehicle housing a relatively high steering effort is required. Furthermore, entering and exiting the vehicle is complicated by the two shells of the housing.

FR 2 626 548 A1 shows a vehicle comprising a spherical housing for use on land, wherein steering is accomplished with a rudder like with boats.

A disadvantage of known systems is that due to high forces occurring heavy constructions are necessary to avoid deformations of the housing, in order to carry the dead weight of the sphere and the weight of the chassis located within the sphere. Previous vehicles also have drawbacks regarding steering and stability.

SUMMARY OF THE INVENTION

One object of the present invention is to provide an above mentioned vehicle avoiding or at least enormously reducing the prior art disadvantages and allowing for an optimum steering. The vehicle is supposed to be designed in a preferably simple and robust manner and to be produced as inexpensive as possible such that a wide use can be ensured. Furthermore, the vehicle is supposed to meet appropriate safety conditions.

The object of the invention is solved by disposing the seat laterally displaceable relative to the lower seat structure. The vehicle rolls off at the drive and running surface of the housing directly. By avoiding running tires the tilt center point is located above the rotational axis of the housing, thus, providing more balanced stability to the whole construction and, thus, allowing the driver to return from his strongly inclined position into his original one. Thus, uncontrolled lateral tilting is not about to occur. Since the lower seat structure is suspended with the seat and—while used by the person—in the rotational axis of the housing, there are no high forces acting on the housing, whereby it can be operated more easy. Moreover, other, more stable materials than transparent synthetic materials can be used for the lower seat structure. Steering of the vehicle is accomplished by lateral displacement of the seat relative to the lower seat structure. The present vehicle clearly differs from prior art constructions by this steering principle. Since the drive is disposed on the lower seat structure and connected thereto, the weight of the drive is also induced into the rotational axis of the housing. The door has to be constructed such that a person is able to enter or exit from land and water. Accordingly, the door can be placed on any suitable position of the housing. It is also possible to divide the housing into two parts, wherein one part is designed such that it can be folded open relative to the other part.

Preferably, the seat is displaceably disposed by at least 180° (i.e. 90° to the right and to the left each) relative to the lower seat structure. When the seat is displaced by 90° to the right or left relative to lower seat structure, then the rotational axis is significantly oriented vertically to the ground. If in this position, in case of a spherical housing, the lower seat structure relative to the housing is driven, it rotates about the vertically oriented rotational axis causing a rotation of the housing in the actual position thereof (i.e., without moving forward). If the seat is displaced by 180° to the right or the left relative to the lower seat structure, then the rotational axis is significantly horizontally oriented to the ground like prior to rotation, but the position of the lower seat structure has changed due to the fixed connection of the drive and the lower seat structure. Following a 180° rotation the drive is no more located below the seat, but exactly above. Thus, a change in direction of the vehicle can be achieved without changing the drive direction of the drive. The drive and steering principles mentioned above, particularly the "steering in actual position" and "change in direction without changing of drive" are significant features of the present construction.

The drive can be coupled to one coupling element connected to the housing in a non-rotatable manner in the rotational axis of the housing. In this embodiment power is transmitted to the rotational axis directly. Naturally, between drive and coupling element a gearbox can of course be employed to improve power transmission.

Alternatively, the drive can also be coupled to an inner surface of the housing.

The coupling of the drive and the coupling element or the inner surface of the housing can be accomplished by gear wheels or driving wheels.

Preferably, the drive is formed by an electric motor. Alternative embodiments, for example internal combustion engines, or a mechanical pedal drive are also imaginable.

To provide a better drive, particularly for use on water, but also a better steerability, driving elements, such as blades, can be disposed on the drive and running surface of the housing.

Preferably, said drive elements or blades can be designed replaceable.

The drive elements or blades can be disposed along the central circumferential line of the drive and running surface of the housing or also on both sides of the central circumferential line of the drive and running surface of the housing.

If the drive elements or blades are disposed lowerable and foldable in the housing, they can for example be retracted when moving on land and extended when moving on water.

To steer the vehicle, a device for electric displacement of the seat relative to the lower seat structure can be provided.

To prevent the vehicle in water from tilting when a person enters or exits, air chambers can be arranged in or on the housing for stabilization. In case of using the vehicle in water such air chambers can also prevent sinking when water enters the housing. Also, by flooding said air chambers, particularly during entering and exiting, an increase in stabilization can be achieved. Said flooding of the air chambers can be accomplished by using an appropriate pump.

In case of air chambers attached on the outside of the housing these can be designed to be preferably folded away individually.

To fix the vehicle when not in use, particular on water, an anchor system can be provided. This anchor system can be designed differently.

When a device for adjusting the seat relative to lower seat structure is provided between lower seat structure and seat, then on the one hand an adjustment to the size of the respective person can be made and on the other hand a change of the center of gravity can be made. Also, by means of such an adjustment device the stability during entering and exiting and during driving can be increased. Depending on the desired sensitivity the center of gravity can be displaced upwards or downwards during driving, whereas for entering or exiting the center of gravity is displaced to its deepest position for maximum stability.

Preferably, the at least one door is in open condition designed as an extension arm to stabilize the housing. On water a spherical housing is particularly instable, whereby entering and exiting would become complicated. The door, which in open condition is designed as an extension arm, minimizes said instability during entering or exiting.

It is an advantage when the at least one door is designed double-walled so that an air chamber is formed within, which is used as a door lifting body.

In addition, the stability of the vehicle with open door can be improved in that, that the at least one door has at least one fin, which fin can be retracted or folded in closed condition of the door. With the door opened and the fin folded away or extended the door would improve the stability transverse to the direction of driving, and the fin would improve the stability alongside the direction of driving.

To ensure a supply of fresh air and to avoid overheating inside the housing air openings are advantageously provided in the housing. To prevent water from entering the housing while driving the air openings can be equipped with check valves or the like.

Preferably, said air openings are significantly disposed in the rotational axis of the housing.

By means of at least one ventilating fan in at least one air opening air circulation can be created.

Alternatively, other rotation-symmetrical shapes having a convex drive and running surface, particularly the shape of an ellipsoid, can be used as the housing. To provide good running and steering characteristics it is essential for the running surface not to be too wide.

Preferably, the housing is made of synthetic material, reinforced by corresponding measures, if need be.

BRIEF DESCRIPTION OF THE DRAWINGS

In the following the operation of the vehicle is described in more detail by means of the attached drawings, schematically showing one embodiment of the invention. In which.

DETAILED DESCRIPTION OF THE INVENTION

Figure 1:
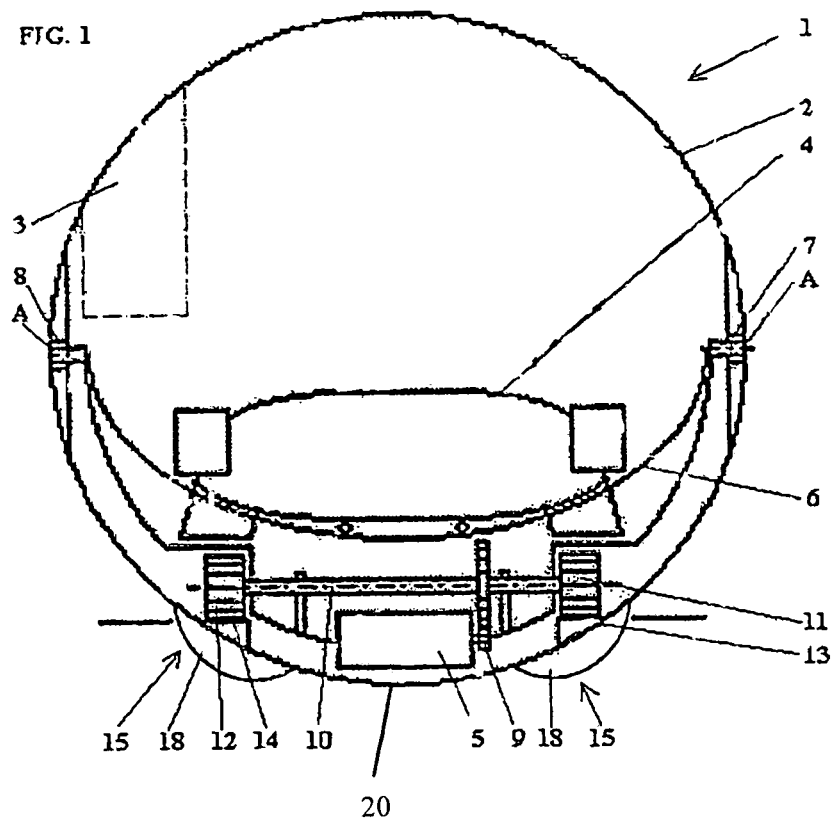
FIG. 1 shows a cross-section of an embodiment of a vehicle comprising a spherical housing, seen in direction of driving.

FIG. 1 shows a cross-section of an embodiment of a vehicle 1 according to the present invention. In the presented example the housing 2 of vehicle 1 is designed spherical. However, other rotation-symmetrical shapes having a convex drive and running surface 20, for example an ellipsoid, are also imaginable for housing 2. In an appropriate position in housing 2 at least one door 3 is located for the driver to enter and exit. To allow the driver to look outside, the housing 2 is at least partially made of transparent material. Inside the housing 2 a seat 4 for at least one person is disposed. A drive 5, which can be formed by an electric motor, sets housing 2 in rotation. Movement of vehicle 1 on water or land is accomplished by rolling off of housing 2. The vehicle 1 can be steered by means of a steering device. According to the invention, seat 4 is disposed on a lower seat structure 6, which is rotatably supported in bearings 7, 8 disposed in the rotational axis A of housing 2. By said suspension of seat 4 optimum distributions of forces are achieved, whereby the housing 2 is not exposed to too high forces and can, thus, be operated more easy. For steering vehicle 1 seat 4 is disposed such that it can be laterally displaced relative to lower seat structure 6. To ensure optimum steering ability, seat 4 is preferably disposed to be displaceable by at least 180°, optimum by 360° relative to lower seat structure 6. When seat 4 is displaced by 180° to the right or the left relative to lower seat structure 6, then in case of a spherical housing 2 the rotation of housing 2 in actual position is possible. Thus, the rotational axis A is oriented vertically to the ground. In rotation of seat 4 relative to lower seat structure 6 by 180° to the right or the left a change in direction of vehicle 1 by 180° is achieved.

In the embodiment shown drive 5 is disposed below seat 4 and lower seat structure 6 and connected thereto. The drive is accomplished by a gearbox 9 onto a shaft 10, on which driving wheels 11, 12 are attached. Said driving wheels 11, 12 roll off on roll-off surfaces 13, 14 appropriately designed inside the housing 2 and, thus, set the housing in rotational movement about rotational axis A. To provide a better drive, particularly in water, driving elements 15, for example in the form of blades 18, can be arranged on the drive and running surface of the housing 2.

Figure 2:
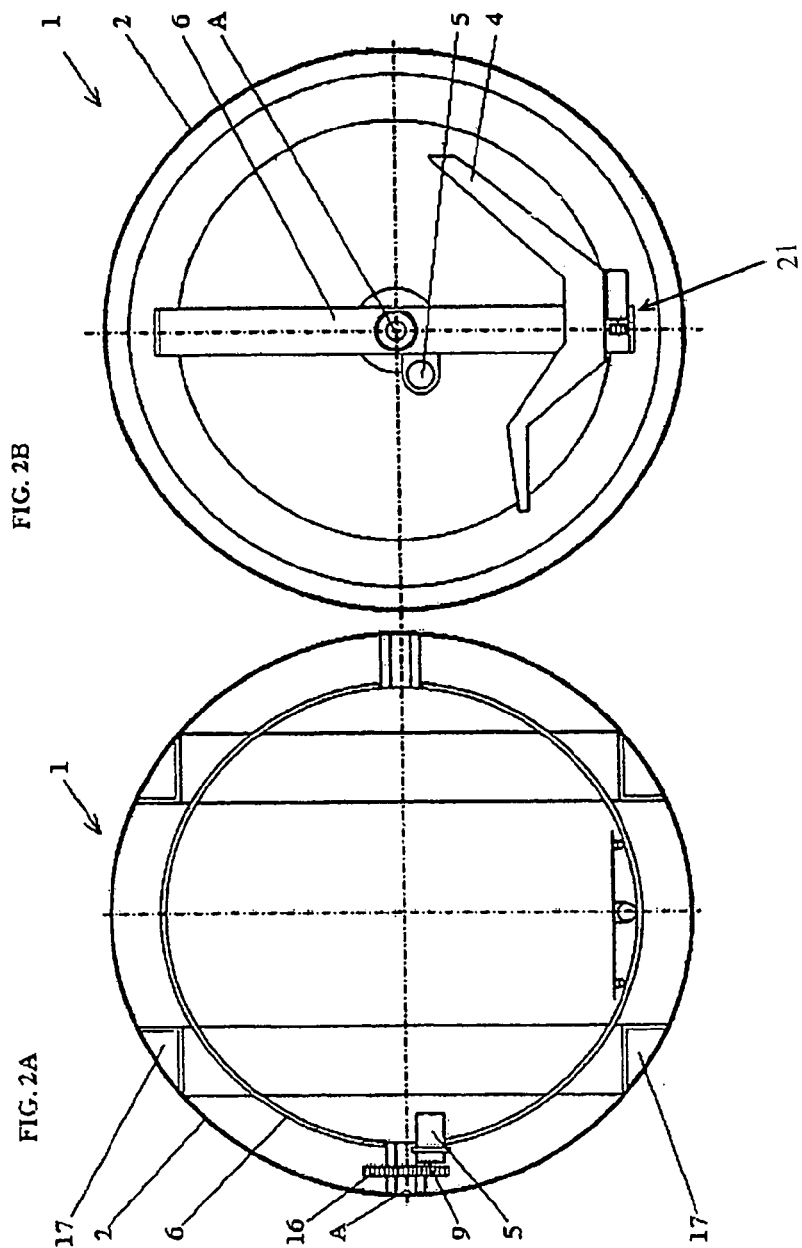
FIGS. 2A and 2B show a cross-section of another embodiment of a vehicle, seen in direction of driving and transverse to direction of driving.

In FIGS. 2A and 2B two views of another embodiment of the invention are shown, in which seat 4 is displaceably supported on a circular lower seat structure 6. In the embodiment shown drive 5 acts directly or via gearbox 9 on a coupling element 16 in the rotational axis A of housing 2. When seat 4 is displaced by 180° an entire change in direction can be achieved, whereas when seat 4 is adjusted relative to lower seat structure 6 by less than 90° an appropriate steering of vehicle 1 can be achieved. When seat 4 is displaced relative to lower seat structure 6 by 90° exactly the rotational axis A is significantly vertical to the ground. In case of a disposition of the appropriate drive elements 15 (see FIG. 1) on the outer surface of housing 2 steering with extremely low radii can be enabled. Adjustment of seat 4 relative to lower seat structure 6 can be accomplished electrically by a device 21 for electrical displacement of the seat 4 or mechanically. Inside the housing 2 or on the outer surface of the housing 2 air openings 17, 22 can be disposed used for stabilization when vehicle 1 is used in water. In case of air chambers 17 disposed on the outer surface of housing 2 these can be preferably designed to be folded away individually. As previously mentioned, air openings 17, 22 disposed in or on housing 2 can also be flooded with water and, thus, particularly during entering and exiting, a more stable position of vehicle 1 in water can be achieved (not shown).

Figure 3:
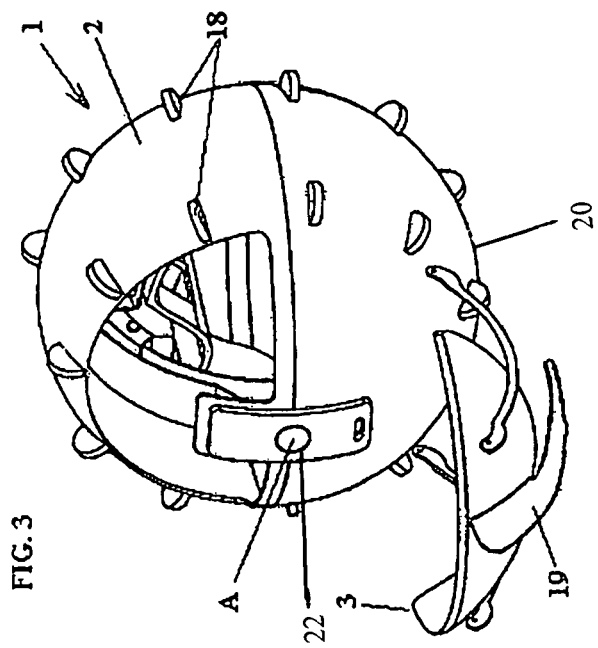
FIG. 3 shows an isometric view of an embodiment of a vehicle with open door.

FIG. 3 shows an isometric view of another embodiment of the vehicle 1 having a spherical housing 2 according to the invention. About rotational axis A two rows of blades 18 are arranged, which are preferably designed foldable or retractable such that driving the vehicle 1 on land becomes also possible. In open condition door 3 is designed as an extension arm providing stability to vehicle 1 during entering and exiting. This is further improved in that door 3 is preferably designed double-walled so that an air chamber is formed within door 3. In addition, a fin 19 can provide still more stability during entering and exiting the vehicle. In closed condition of door 3 fin 19 can be retracted or folded onto the housing 2 of vehicle 1.

Figure 4:
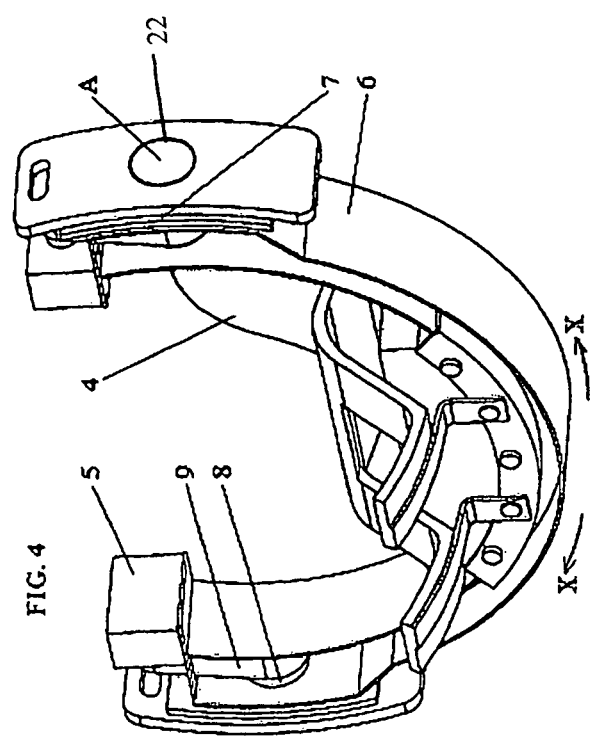
FIG. 4 shows an isometric view of the seat and lower seat structure plus drive according to one embodiment of the vehicle.

FIG. 4 shows a detailed view of the drive and the steering mechanism of vehicle 1 according to the invention, wherein seat 4 is disposed such that it can be laterally displaced by 90° relative to lower seat structure 6 according to X arrows. The lower seat structure 6 is rotatably supported about rotational axis A by means of bearings 7, 8. Drive 5 sets the housing 2 in rotation by means of a gearbox 9.

The invention claimed is:

1. A vehicle comprising:
   a rotation-symmetrical housing disposed about a rotational axis and having a convex drive and running surface, wherein the housing is at least partially formed of transparent material;
   at least one door for at least one person to enter and exit;
   a seat inside the housing for the at least one person;
   a drive for setting the housing in rotation; and
   a device for steering;
   wherein bearings are provided in the rotational axis of the housing for rotatably supporting a lower seat structure receiving the seat, the drive is disposed on the lower seat structure and connected thereto, and the seat is disposed laterally displaceable relative to the lower seat structure.

2. The vehicle according to claim 1, wherein the seat is displaceably disposed relative to the lower seat structure at least by 180°.

3. The vehicle according to claim 1, wherein the drive is coupled to a coupling element connected to the housing in a non-rotatable manner in the rotational axis of the housing.

4. The vehicle according to claim 3, wherein the coupling of the drive and the coupling element is accomplished by gear wheels.

5. The vehicle according to claim 3, wherein the coupling of the drive and the coupling element is accomplished by driving wheels.

6. A vehicle according to claim 1, wherein the drive is coupled to an inner surface of the housing.

7. The vehicle according to claim 1, wherein the drive is formed by an electric motor.

8. The vehicle according to claim 1, wherein drive elements are arranged on the drive and running surface of the housing.

9. The vehicle according to claim 8, wherein the drive elements are designed to be replaceable.

10. The vehicle according to claim 8, wherein the drive elements are arranged along a central circumferential line of the drive and running surface of the housing.

11. The vehicle according to claim 8, wherein the drive elements are arranged on both sides of a central circumferential line of the drive and running surface of the housing.

12. The vehicle according to claim 8, wherein the drive elements are disposed lowerable and foldable in the housing.

13. The vehicle according to claim 1, further comprising a device for electrical displacement of the seat relative to the lower seat structure.

14. The vehicle according to claim 1, wherein air chambers are disposed in or on the housing.

15. The vehicle according to claim 1, wherein air openings are provided in the housing.

16. The vehicle according to claim 15, wherein the air openings are significantly disposed in the rotational axis of the housing.

17. The vehicle according to claim 15, wherein in at least one air opening of the air openings, a ventilating fan is disposed.

18. The vehicle according to claim 1, wherein the at least one door is in an opened condition thereof designed as an extension arm for stabilization of the housing.

19. The vehicle according to claim 18, wherein the at least one door is double-walled.

20. The vehicle according to claim 1, wherein the housing is made of synthetic material.

* * * * *